Patented Dec. 5, 1939

2,182,308

UNITED STATES PATENT OFFICE 2,182,308

MANUFACTURE OF PHENOL-KETONE CONDENSATION PRODUCTS

Edgar C. Britton and Fred Bryner, Midland, Mich., assignors to The Dow Chemical Company, Midland, Mich., a corporation of Michigan No Drawing. Application June 18, 1938,
Serial No. 214,565

6 Claims. (Cl. 260—619)

This invention concerns an improved method of manufacturing certain phenol-ketone condensation products, hereinafter referred to generically as "bis-phenols". It particularly concerns procedure for the separation of such products from the unreacted chemical agents used in their preparation.

The bis-phenols herein referred to have the general formula

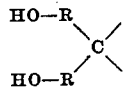

wherein R is an aryl group and the free bonds are linked with alkyl groups or an alkylene radical. They are commonly prepared by reacting a phenol, e. g. phenol, o-cresol, etc., with a ketone such as acetone, methyl-ethyl-ketone, dibenzyl ketone, cyclohexanone, etc., in the presence of a concentrated strong mineral acid such as sulphuric or hydrochloric acid. The reaction may be carried out at room temperature but is usually conducted at temperatures from 30° to 90° C. As the reaction progresses, the bis-phenol product solidifies, frequently as a double compound thereof with the phenol reactant. After completion of the reaction the mixture is a thick slurry or mass comprising the bis-phenol product (usually as the double compound just mentioned); unconsumed phenol, which may also be present as such double compound; and the mineral acid employed to promote the reaction.

Separation of the bis-phenol from the reaction mixture to recover the same in good yield and satisfactorily pure form has heretofore been troublesome. The mineral acid must be removed before the phenol may be distilled off in equipment constructed of iron or steel since otherwise the acid causes corrosion of the equipment and contamination of the product with iron salts. The major portion of the acid may conveniently be removed by moderate washing with water, and this frequently is done, but repeated washings are necessary in order to remove the acid completely enough to permit handling of the mixture in an iron or steel still. Such extensive washing is not only troublesome and expensive, but often results in considerable loss of the unreacted phenol present in the mixture due to its solubility in the wash water.

We have found, in our research, that it is not feasible to neutralize the acid, remaining after moderate washing, with an alkali metal (e. g. sodium or potassium) hydroxide, carbonate, or bicarbonate, since exact neutralization of the mineral acid in the mixture is difficult and troublesome and the introduction of even a slight excess of any of said alkalies results in resinification or decomposition of the bis-phenol product during subsequent distillation of phenol from the product. Such decomposition during distillation is observed even when a slight excess of the very mild neutralizing agent, sodium acetate, is used for neutralization of the mineral acid. However, we have further discovered that basic alkaline earth metal compounds, e. g. calcium oxide, calcium hydroxide, calcium carbonate, or an oxide, hydroxide or carbonate of strontium, barium, or magnesium, behave differently from the other neutralizing agents just mentioned and may be used in moderate excess to neutralize the mineral acid in a reaction mixture after which unreacted phenol can be distilled from the bis-phenol product without excessive loss of the latter through decomposition or resinification. On the basis of this discovery, we have invented the improved method of manufacturing bis-phenols hereinafter described and claimed.

The reaction for formation of the bis-phenol may be carried out in known manner; hence detailed description of this reaction is unnecessary. However, it may be mentioned that a strong mineral acid, such as sulphuric acid or hydrochloric acid, preferably the latter, is used to promote the condensation of a phenol with a ketone to form a bis-phenol and that the yield of bis-phenol is highest when the phenolic reactant is employed in a proportion exceeding that theoretically required. Any ketone, e. g. acetone, methyl ethyl ketone, diethyl ketone, dibutyl ketone, cyclohexanone, may be employed in the reaction and also a variety of phenols can be used; for instance, phenol, o-cresol, o-chlorphenol, etc., are suitable.

The reacted mixture, which is a thick slurry or solid mass, may be ground, if necessary, and washed directly with from 1 to 3 times its volume of water to remove most of the acid employed to promote the reaction. However, this washing operation can be carried out more conveniently by first dissolving the reacted mixture in a water-immiscible solvent such as benzene, chlorobenzene, ortho-dichlorobenzene, toluene, xylene, etc., and then washing this solution with water. As hereinbefore stated, such washing operation unless continued beyond the point feasible in commercial practice does not remove the acid condensing agent completely enough to permit subsequent handling of the mixture in iron equipment. This residual acid is then neutralized by treating the mixture with a basic alkaline earth metal compound, preferably lime, either in powdered form or as an aqueous solution or slurry. Usually, from 0.5 to 1 mole of lime, i. e. either calcium oxide or calcium hydroxide, is used per mole of hydrogen chloride in the product under treatment, but the lime may be employed in far greater proportion if desired. The only disadvantage of using a large excess of lime is that it may form a salt with a portion of the bis-phenol, thus necessitating subsequent acidification of the salt in order to obtain complete recovery of the product.

After the treatment with lime, the mixture is subjected to distillation. The distillation may be started at atmospheric pressure, but is completed preferably at an absolute pressure not exceeding about 50 millimeters of mercury and a temperature sufficient to remove substantially all unreacted phenol from the product. In manufacturing di-(4-hydroxyphenyl)-dimethyl-methane from phenol and acetone, this distillation may be satisfactorily completed at a temperature of 170° C. and a pressure of 25 millimeters, but other temperatures and pressures will, of course, be necessary in purifying other bis-phenol products. The residual bis-phenol is usually of good technical quality entirely satisfactory for use in the manufacture of resins. If desired, it may be purified completely by conventional procedure, e. g. distillation under vacuum in some instances, or by fractional crystallization from solvents such as benzene, chlorobenzene, dilute aqueous acetic acid, etc.

*Example*

In comparative experiments carried out for purpose of illustrating the advantage of employing a basic alkaline earth metal compound, rather than other neutralizing agents, for removal of residual mineral acid in a crude bis-phenol prior to purifying the latter by distillation, three portions of crude crystalline di-(4-hydroxyphenyl)-dimethyl-methane which had been prepared by condensing phenol with acetone in the presence of hydrogen chloride and washing the product with water, and which retained 0.04 per cent by weight of hydrogen chloride, considerable unreacted phenol, and some moisture were treated with sodium carbonate, sodium acetate and calcium hydroxide, respectively, each of said added agents being employed in a proportion exceeding that required to neutralize the hydrochloric acid. The mixtures were then separately distilled under vacuum in attempt to remove the unreacted phenol and recover the di-(4-hydroxyphenyl)-dimethyl-methane product in purified form. The pressure under which distillation of the product was attempted was in each instance 4 millimeters absolute pressure. No di-(4-hydroxyphenyl)-dimethyl-methane could be distilled from the mixture which had been treated with sodium carbonate. Instead, decomposition occurred. Some product was distilled from the mixture which had been treated with sodium acetate, but decomposition occurred during the distillation and the distilled product was highly impure. Its freezing point was only 42° C., whereas pure di-(4-hydroxyphenyl)-dimethyl-methane has a freezing point of 157–158° C. In contrast, di-(4-hydroxyphenyl)-dimethyl-methane was distilled without difficulty from the mixture which had been treated with excess lime. This distilled product had a freezing point of 154.4° C.

As hereinbefore pointed out, other basic alkaline earth metal compounds, such as calcium carbonate or an oxide, hydroxide or carbonate of strontium, barium, or magnesium, may satisfactorily be used in place of lime as the neutralizing agent in this process. However, due to its low cost and availability, lime is the most satisfactory agent for commercial practice of the invention.

Other modes of applying the principle of the invention may be employed instead of those explained, change being made as regards the method herein described, provided the step or steps stated by any of the following claims or the equivalent of such stated step or steps be employed.

We therefore particularly point out and distinctly claim as our invention:—

1. In a method of making bis-phenol by reacting a phenol with a ketone in the presence of mineral acid, the steps of neutralizing mineral acid in the reacted mixture with a basic alkaline earth metal compound and thereafter purifying the product by distillation.

2. In a method of making a bis-phenol by reacting a phenol with a ketone in the presence of a mineral acid, the steps of neutralizing mineral acid in the reacted mixture with lime and thereafter distilling organic impurities present in the mixture from the bis-phenol product.

3. In a method of making bis-phenol by reacting a phenol with a ketone in the presence of mineral acid, the steps of washing the reacted mixture with water to remove most of the mineral acid therefrom, neutralizing the residual acid with lime and thereafter distilling organic impurities in the mixture from the bis-phenol product.

4. In a method of making bis-phenol by reacting a phenol with a ketone in the presence of hydrogen chloride, the steps of washing the reacted mixture with water to remove most of the hydrogen chloride therefrom, neutralizing the residual hydrogen chloride with lime and thereafter distilling organic impurities present in the mixture from the bis-phenol product.

5. In a method of making di-(4-hydroxyphenyl)-dimethyl-methane by reacting phenol with acetone in the presence of a mineral acid, the steps of neutralizing mineral acid in the reacted mixture with a basic alkaline earth metal compound and thereafter purifying the di-(4-hydroxyphenyl)-dimethyl-methane product by distillation.

6. In a method of making di-(4-hydroxyphenyl)-dimethyl-methane by reacting phenol with acetone in the presence of hydrogen chloride, the steps of washing the reacted mixture with water to remove most of the hydrogen chloride therefrom, neutralizing the residual hydrogen chloride with lime and thereafter distilling unreacted phenol from the di-(4-hydroxyphenyl)-dimethyl-methane product.

EDGAR C. BRITTON.
FRED BRYNER.